(12) United States Patent
Wang et al.

(10) Patent No.: US 9,734,082 B2
(45) Date of Patent: *Aug. 15, 2017

(54) TEMPORAL STANDBY LIST

(71) Applicant: Microsoft Technology Licensing, LLC, Redmond, WA (US)

(72) Inventors: Landy Wang, Kirkland, WA (US); Yevgeniy Bak, Redmond, WA (US); Mehmet Iyigun, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/806,640

(22) Filed: Jul. 22, 2015

(65) Prior Publication Data
US 2015/0324299 A1  Nov. 12, 2015

Related U.S. Application Data

(63) Continuation of application No. 13/301,781, filed on Nov. 22, 2011, now Pat. No. 9,104,606.

(51) Int. Cl.
| | |
|---|---|
| *G06F 12/00* | (2006.01) |
| *G06F 12/1009* | (2016.01) |
| *G06F 12/126* | (2016.01) |
| *G06F 12/0862* | (2016.01) |
| *G06F 12/02* | (2006.01) |

(52) U.S. Cl.
CPC ........ *G06F 12/1009* (2013.01); *G06F 12/126* (2013.01); *G06F 12/0246* (2013.01); *G06F 12/0862* (2013.01); *G06F 2212/1008* (2013.01); *G06F 2212/152* (2013.01); *G06F 2212/251* (2013.01)

(58) Field of Classification Search
CPC .................................................. G06F 12/0862
See application file for complete search history.

(56) References Cited

U.S. PATENT DOCUMENTS

| | | | |
|---|---|---|---|
| 5,125,086 A | 6/1992 | Perazzoli, Jr. | |
| 6,052,756 A | 4/2000 | Barnaby et al. | |
| 6,910,106 B2 | 6/2005 | Sechrest et al. | |
| 7,330,950 B2 | 2/2008 | Matsunami et al. | |
| 8,161,240 B2 | 4/2012 | Wang | |
| 8,386,708 B2 | 2/2013 | Jess | |
| 9,104,606 B2 * | 8/2015 | Wang | G06F 12/126 |

(Continued)

OTHER PUBLICATIONS

He, et al., "Opportunistic Prioritised Clustering Framework (OPCF)", Retrieved at <<http://citeseerx.ist.psu.edu/viewdoc/download?doi=10.1.1.59.9365&rep=rep1&type=pdf>>, Proceedings of the International Symposium on Objects and Databases, Retrieved Date: Sep. 26, 2011, pp. 13.

(Continued)

*Primary Examiner* — Ryan Bertram
*Assistant Examiner* — Trang Ta
(74) *Attorney, Agent, or Firm* — Workman Nydegger

(57) ABSTRACT

In one embodiment, a memory management system temporarily maintains a memory page at an artificially high priority level. The memory management system may assign an initial priority level to a memory page in a page priority list. The memory management system may change the memory page to a target priority level in the page priority list after a protection period has expired.

20 Claims, 7 Drawing Sheets

(56) References Cited

U.S. PATENT DOCUMENTS

| | | | |
|---|---|---|---|
| 2004/0068627 A1 | 4/2004 | Sechrest et al. | |
| 2007/0055843 A1* | 3/2007 | Lameter | G06F 12/08 711/206 |
| 2009/0307462 A1 | 12/2009 | Fleming et al. | |
| 2010/0199043 A1* | 8/2010 | Sechrest | G06F 12/122 711/118 |
| 2011/0153975 A1 | 6/2011 | Accapadi et al. | |
| 2011/0320690 A1* | 12/2011 | Petersen | G06F 3/0611 711/103 |

OTHER PUBLICATIONS

Pandey, et al., "An Alternative Approach to Temporary Memory Management in Databases using Object Oriented Systems", Retrieved at <<http://paper.ijcsns.org/07_book/201010/20101024.pdf>>, International Journal of Computer Science and Network Security, vol. 10, No. 10, Oct. 2010, pp. 158-165.

"Advances in Memory Management for Windows", Retrieved at <<http://download.microsoft.com/download/9/c/5/9c5b2167-8017-4bae-9fde-d599bac8184a/MemMgt.docx>>, Oct. 12, 2007, pp. 26.

Das, et al., "Application-to-Core Mapping Policies to Reduce Interference in On-Chip Networks", Retrieved at <<http://www.ece.cmu.edu/~omutlu/pub/interference-aware-noc-mapping-TR-SA-FARI-2011-001.pdf>>, May 25, 2011, pp. 24.

"Final Office Action Issued in U.S. Appl. No. 13/301,781", Mailed Date: Nov. 19, 2013, 25 Pages.

"Final Office Action Issued in U.S. Appl. No. 13/301,781", Mailed Date: Jan. 14, 2015, 18 Pages.

"Non-Final Office Action Issued in U.S. Appl. No. 13/301,781", Mailed Date: Jul. 16, 2014, 26 Pages.

"Non-Final Office Action Issued in U.S. Appl. No 13/301,781", Mailed Date: Jun. 21, 2013, 20 Pages.

"Notice of Allowance Issued in U.S. Appl. No. 13/301,781", Mailed Date: Apr. 1, 2015, 9 Pages.

\* cited by examiner

100

*500*

TEMPORAL STANDBY LIST

CROSS-REFERENCE TO RELATED APPLICATIONS

This patent application is a continuation of U.S. patent application Ser. No. 13/301,781 on Nov. 22, 2011, which is herein incorporated by reference in its entirety.

BACKGROUND

A memory manager for an operating system may use demand paging to load memory pages into memory from a data storage. A memory page is a contiguous block of virtual memory that allows a block of data to be transferred between a memory and a data storage. Demand paging transfers data to the physical memory from the data storage upon initial access of the memory page. An access of the virtual memory that has not yet been mapped to the physical memory results in a page fault.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to a memory management system that maintains a memory page at an artificially high priority level for a period of time. The memory management system may assign an initial priority level to a memory page in a page priority list. The memory management system may change the memory page to a target priority level in the page priority list after a protection period has expired without a process access of the memory page.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
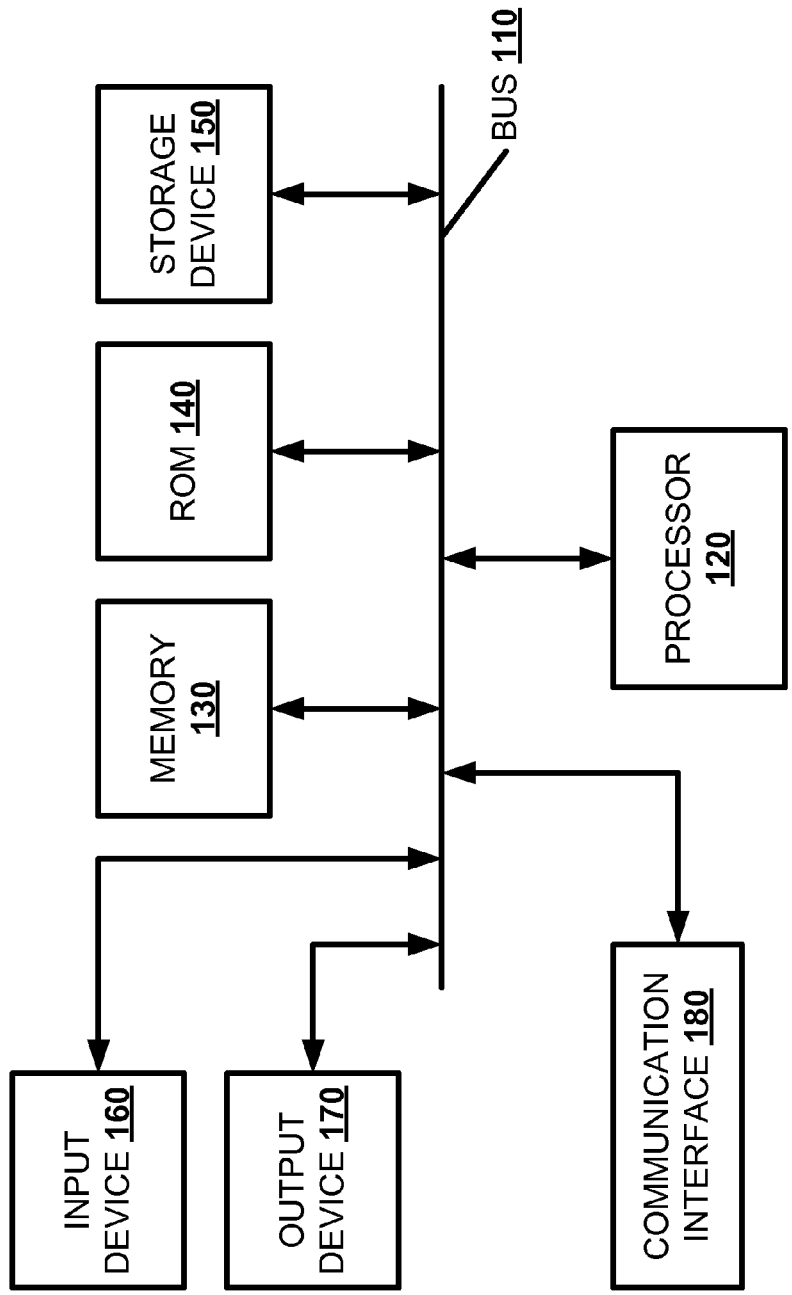
FIG. 1 illustrates, in a block diagram, one embodiment of a computing device.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a memory management system.

The memory management system may use demand paging with clustering to load pages into memory. Clustering may maximize the disk or network accesses to read pages opportunistically into memory so as to minimize future page faults that processes might incur.

The memory management system may represent a physical memory page as a memory page entry in a page priority list. The memory management system may use the page priority list to divide a set of memory page entries into a sequence of priority levels. For example, the priority levels may range from 0-7, with 7 being the highest. A memory page having a memory page entry stored at a lower priority level may be repurposed before a memory page having a memory page entry stored at a higher priority level.

During a clustered page fault, the memory management system may opportunistically retrieve a cluster of memory pages similar to the faulted page when retrieving the faulted page from data storage. The memory management system may add the faulted page to the process working group while placing the extra pages on the page priority list. During normal priority processes, these opportunistic pages may consume space assigned to valuable normal priority pages in memory. In the case of low priority processes, these opportunistic pages may be repurposed from memory too soon, negating the intended benefits.

The memory management system may protect memory pages that have been brought into memory opportunistically for a period of time to allow processes the opportunity to access or use these memory pages, regardless of memory priority. The memory management system may protect a memory page in the page priority list by temporarily placing the corresponding memory page entry at a normal memory priority on the page priority list. By placing a memory page entry in the page priority list at an initial priority level of normal memory priority, the memory management system may ensure that the corresponding memory page may be preserved in memory for a longer period of time. Thus a process may be allowed the opportunity to access these pages. The protected memory pages may be treated in the exact same way as normal priority pages regarding aging policies. Memory pages represented in the page priority list may avoid impacting the memory prioritization and behavior of other pages in memory, ensuring fairness regarding memory prioritization. Eventually, the memory management system may change the memory pages from an initial priority level to a different priority level, referred to as a target priority level. The target priority level may be higher or lower than the initial priority level.

The memory management system may cluster memory pages brought in opportunistically and represent the memory page cluster using a single placeholder page entry maintained at a normal priority level on the page priority list. A placeholder page entry associates one or more memory pages with one or more metadata tags without expanding the page entry data structure. The metadata tags may be an initial priority level, a target priority level, an expiration period, or even metadata unrelated to the priority list. Once the protection period expires for a placeholder page entry, the memory management system may move the corresponding cluster of pages to a target priority level, which may be a higher priority level or lower priority level. The memory management system may ensure that the implementation is efficient and has minimal overhead in representing pages on the page priority list.

If a process accesses any of the memory pages on the page priority list, the memory management system may move the accessed memory page to the working group of the process, at which point the memory page may be treated as any other page belonging to a process. If the memory pages belonging to a cluster are not accessed by any process for the protection period, the memory management system may reprioritize the memory page cluster and insert the memory page cluster into the page priority list at a priority level appropriate for those memory pages. For example, the memory management system may decrement the priority level, ensuring minimal impact on the system due to the opportunistic pages.

The memory management system may use the temporal priority level for hard fault cluster read, a page pre-fetch, a cache manager read ahead, or an antimalware scan. Hard fault clustering seeks to maximize the effect of disk or network accesses by reading pages opportunistically into memory, minimizing future page faults. A page pre-fetch seeks to speed up boot process and application startup by monitoring the data and code accessed during these scenarios and using that information at the beginning of subsequent boot or application startups to read in code and data. A cache manager read ahead attempts to make disk reads more efficient by reading ahead memory pages accessed by the cache manager. An antimalware scan reads files on behalf of users or other applications at a low priority level to minimize impact to the system.

Thus, in one embodiment, a memory management system temporarily maintains a memory page at an artificially high priority level. The memory management system may assign an initial priority level to a memory page in a page priority list. The memory management system may change the memory page to a target priority level in the page priority list after a protection period has expired without a process access of the memory page.

FIG. 1 illustrates a block diagram of an exemplary computing device 100 which may act as a memory management system. The computing device 100 may combine one or more of hardware, software, firmware, and system-on-a-chip technology to implement a memory management system. The computing device 100 may include a bus 110, a processor 120, a memory 130, a read only memory (ROM) 140, a storage device 150, an input device 160, an output device 170, and a communication interface 180. The bus 110 may permit communication among the components of the computing device 100.

The processor 120 may include at least one conventional processor or microprocessor that interprets and executes a set of instructions. The memory 130 may be a random access memory (RAM) or another type of dynamic storage device that stores information and instructions for execution by the processor 120. The memory 130 may also store temporary variables or other intermediate information used during execution of instructions by the processor 120. The memory 130 may store a page priority list. The ROM 140 may include a conventional ROM device or another type of static storage device that stores static information and instructions for the processor 120. The storage device 150 may include any type of tangible machine-readable medium, such as, for example, magnetic or optical recording media and its corresponding drive. The storage device 150 may store a set of instructions detailing a method that when executed by one or more processors cause the one or more processors to perform the method.

The input device 160 may include one or more conventional mechanisms that permit a user to input information to the computing device 100, such as a keyboard, a mouse, a voice recognition device, a microphone, a headset, etc. The output device 170 may include one or more conventional mechanisms that output information to the user, including a display, a printer, one or more speakers, a headset, or a medium, such as a memory, or a magnetic or optical disk and a corresponding disk drive. The communication interface 180 may include any transceiver-like mechanism that enables computing device 100 to communicate with other devices or networks. The communication interface 180 may include a network interface or a mobile transceiver interface. The communication interface 180 may be a wireless, wired, or optical interface.

The computing device 100 may perform such functions in response to processor 120 executing sequences of instructions contained in a computer-readable medium, such as, for example, the memory 130, a magnetic disk, or an optical disk. Such instructions may be read into the memory 130 from another computer-readable medium, such as the storage device 150, or from a separate device via the communication interface 180.

Figure 2:
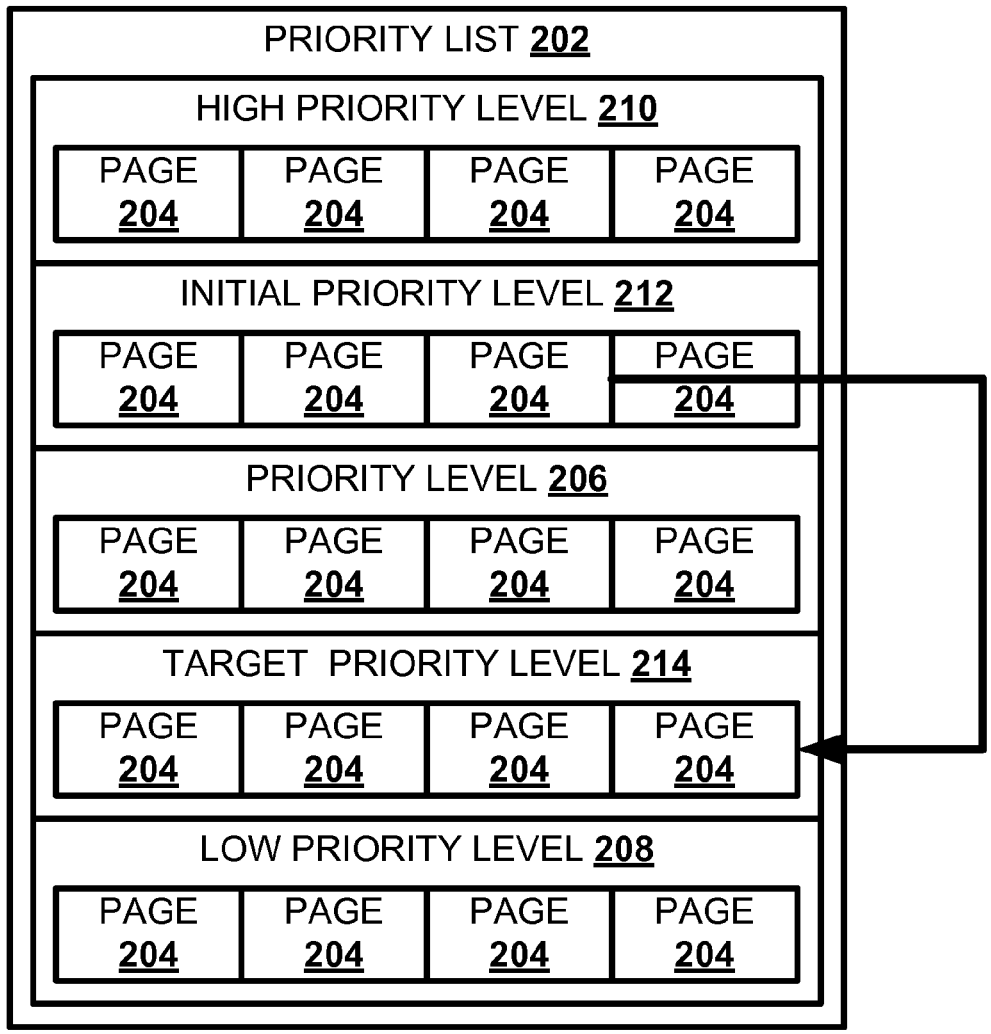
FIG. 2 illustrates, in a block diagram, one embodiment of a memory management layout usable by a memory management system.

FIG. 2 illustrates, in a block diagram, one embodiment of a memory management layout 200 usably by a memory management system. The memory management layout 200 may have a page priority list 202 that lists by order of priority a set of memory page entries 204 representing a set of memory pages. The memory management layout 200 may set a priority level 206 for each memory page entry 204. When the memory 130 is replacing or reusing memory pages for any reason, the memory management layout 200 may replace a memory page with a memory page entry 204 at a lower priority level 208 before replacing a memory page with a memory page entry 204 at a higher priority level 210. As a memory page may be more likely to be accessed closer to a read from a data storage device 150, the memory management layout 200 may assign an initial priority level 212 that has a relatively high priority level 210. After a protection period has lapsed, the memory page entry 204 of that memory page may be moved to a target priority level 214.

Figure 3:
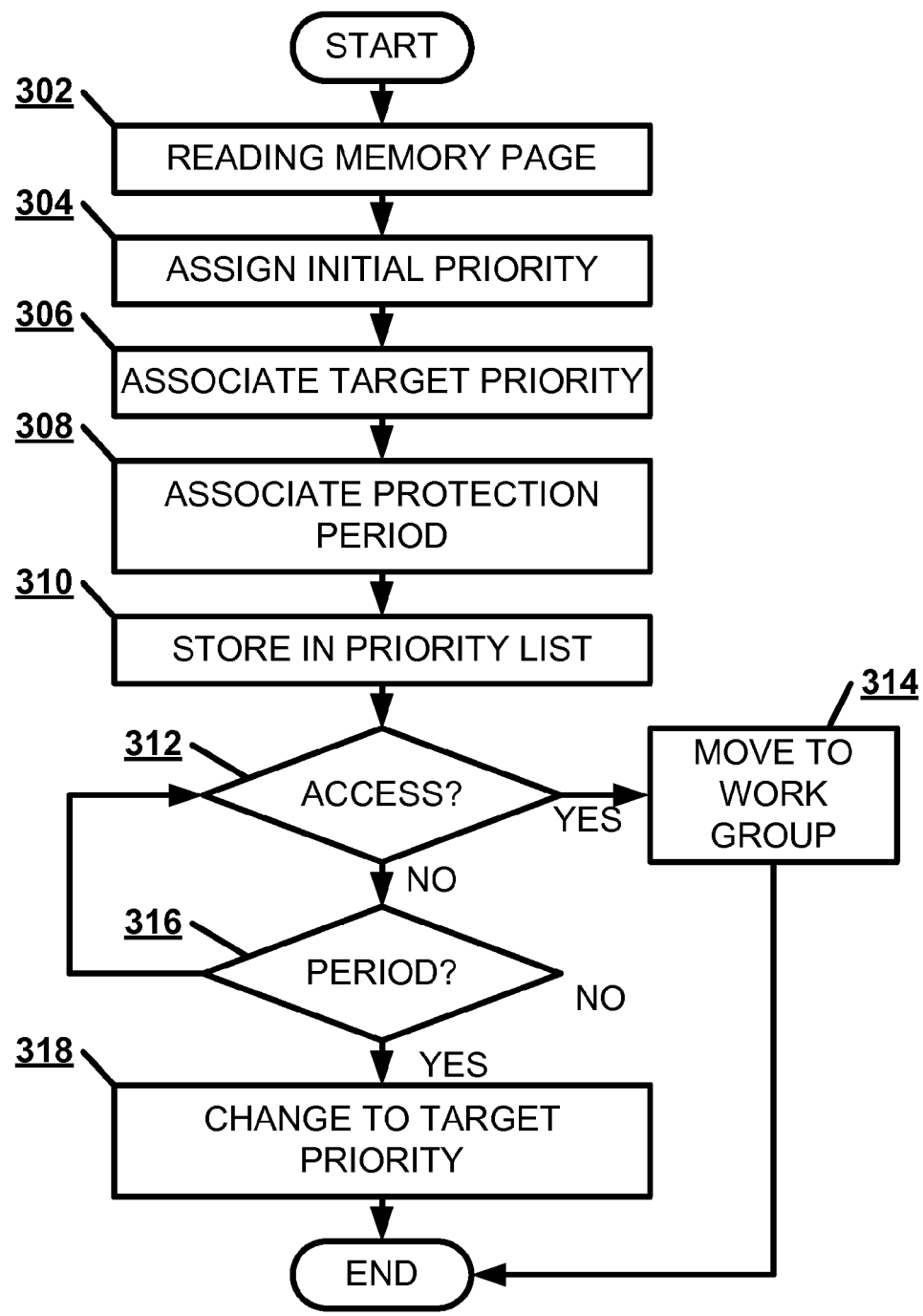
FIG. 3 illustrates, in a flowchart, one embodiment of a method for using a temporal standby list.

FIG. 3 illustrates, in a flowchart, one embodiment of a method 300 for using a memory management layout 200. The memory management system may read the memory page from the data storage device 150 (Block 302). The memory management system may read the memory page as part of at least one of a hard fault cluster read, a page pre-fetch, a cache manager read ahead, or an antimalware scan. The memory management system may assign an initial priority level 212 in a page priority list 202 to the memory page (Block 304). The memory management system may associate a target priority level 214 with the memory page (Block 306). The memory management system may associate a protection period with the memory page (Block 308). The memory management system may store a memory page entry 204 representing the memory page in the page priority list 202 at the initial priority level 212 (Block 310). If a process executes a process access of the memory page (Block 312), the memory management system may move the memory page 204 to a working group for the process (Block 314). Otherwise, if the protection period has expired (Block 316), the memory management system may change the memory page to the target priority level 214 in the page priority list 202 (Block 318).

Figure 4:
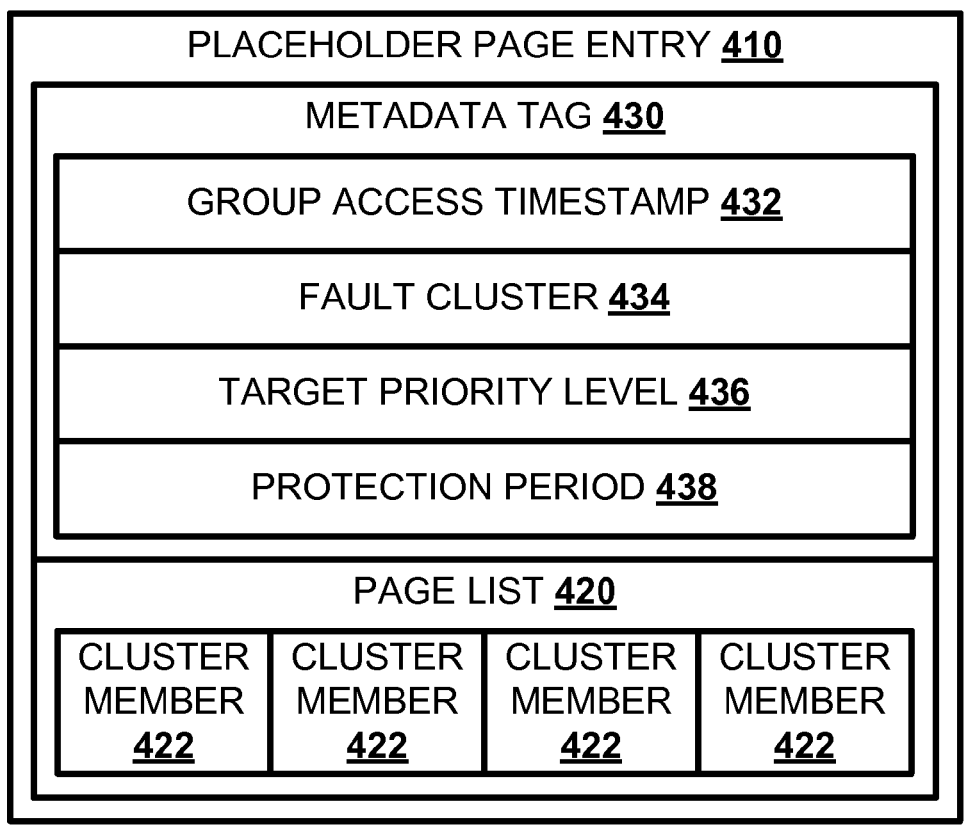
FIG. 4 illustrates, in a block diagram, one embodiment of a spatially efficient memory management layout usable by a memory management system.

To conserve space in the regular data structure per physical page in the system, a space efficient memory management system may use a placeholder page entry. The placeholder page entry may store metadata associated with a physical page to avoid storing the metadata in the actual per-page data structure and reduce the overall footprint of that memory page in the system. FIG. 4 illustrates, in a block diagram, one embodiment of a spatially efficient memory management layout 400 usable by a memory management system. The spatially efficient memory management layout 400 may use a placeholder page entry 410. A placeholder page entry 410 may associate a memory page cluster list 420 with a metadata tag 430. The memory page cluster list 420 lists each cluster member 422 of a memory page cluster. The metadata tag 430 may describe multiple types of metadata, such as a group access timestamp 432, a fault cluster description 434, a target priority level identifier 436, a protection period 438, or other metadata. A group access timestamp 432 identifies when the memory page cluster is accessed from the data storage device 150. A fault cluster description 434 describes the type of data gathered as part of the fault cluster.

Figure 5:
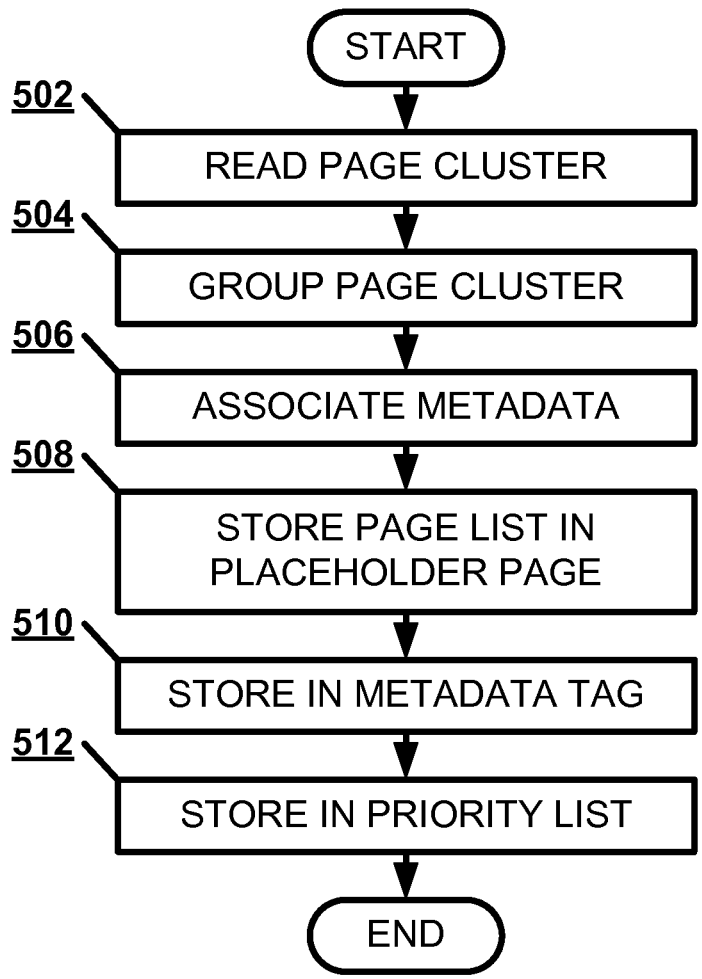
FIG. 5 illustrates, in a flowchart, one embodiment of a method of managing a memory page cluster using a spatially efficient memory management layout.

FIG. 5 illustrates, in a flowchart, one embodiment of a method 500 of managing a memory page cluster using a spatially efficient memory management layout 400. The memory management system may read a memory page cluster from a data storage device 150 (Block 502). The memory management system may read the memory page cluster as part of at least one of a hard fault cluster read, a page pre-fetch, a cache manager read ahead, or an antimalware scan. The memory management system may group memory pages as a memory page cluster (Block 504). The memory management system may associate a metadata set with the memory page cluster (Block 506). The memory management system may store a memory page cluster list 420 of a memory page cluster in a placeholder page entry 410 (Block 508). The memory management system may store a metadata tag 430 describing the memory page cluster in the placeholder page entry 410 (Block 510). The metadata tag 430 may be a group access timestamp 432, a fault cluster description 434, a target priority level 436, a protection period 438, or other metadata describing the memory page cluster. The memory management system may store the placeholder page entry 410 in a page priority list 202 at an initial priority level 212 (Block 512).

Figure 6:
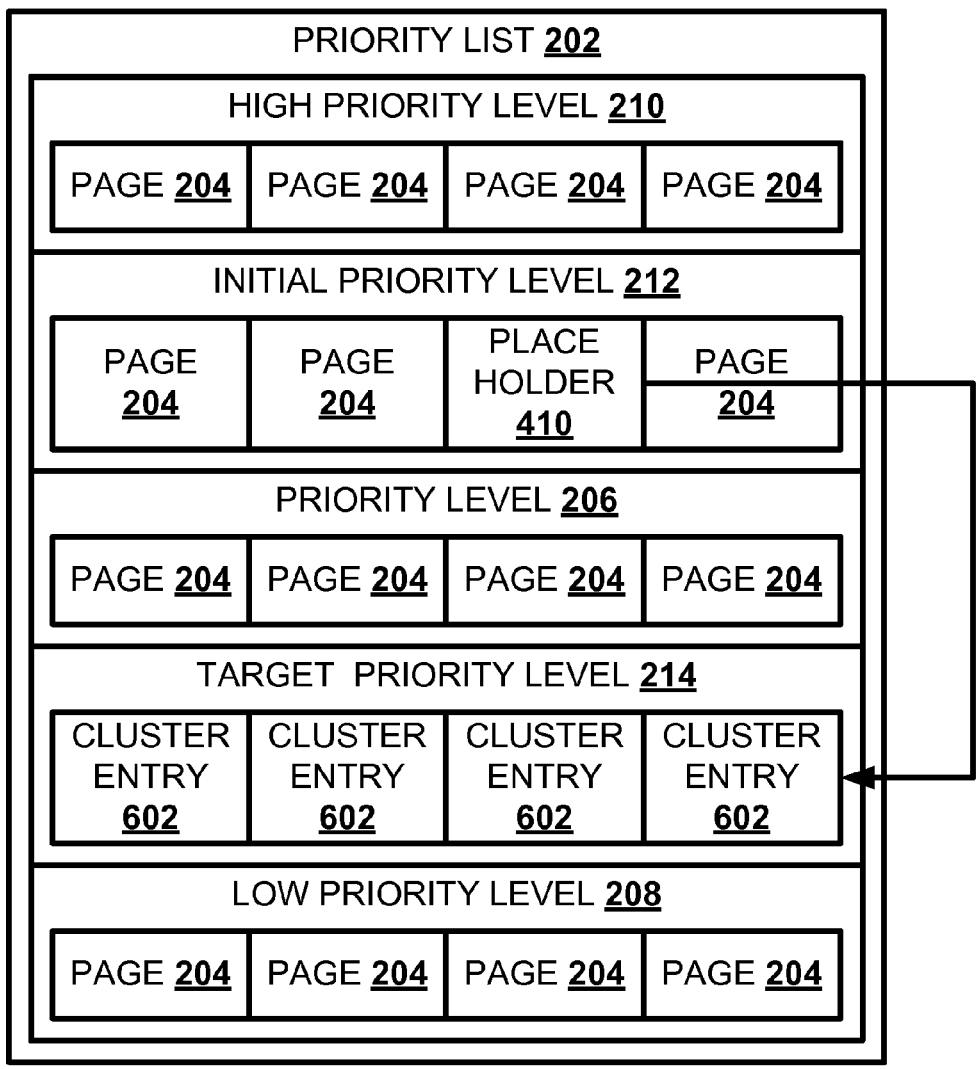
FIG. 6 illustrates, in a block diagram, one embodiment of a hybrid memory management layout.

By combining a placeholder page entry 410 with a temporal standby list, the memory management system may be made both temporally efficient and spatially efficient. FIG. 6 illustrates, in a block diagram, one embodiment of a hybrid memory management layout 600. The hybrid memory management layout 600 may read a memory page cluster from the data storage device 150. The hybrid memory management layout 600 may store the memory page cluster in a placeholder page entry 410 assigned to an initial priority level 212 in the page priority list 202. The placeholder page entry 410 may store in a metadata tag 430 a target priority level identifier 436 indicating a target priority level 214 that cluster page entries 602 representing the memory page cluster is moved to if a protection period 438 passes without a process access.

Figure 7:
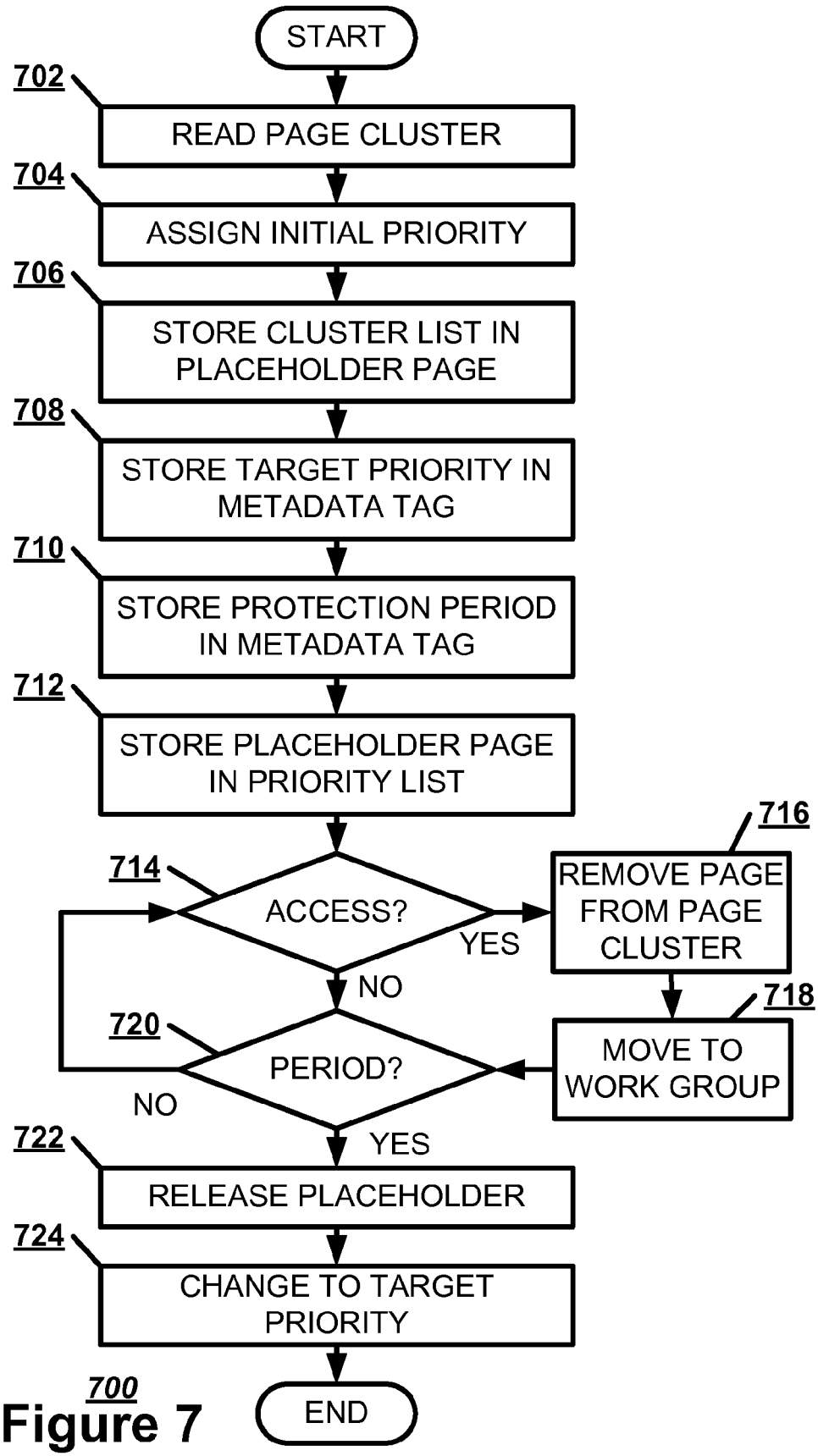
FIG. 7 illustrates, in a flowchart, one embodiment of a method for managing memory using a hybrid memory management layout.

FIG. 7 illustrates, in a flowchart, one embodiment of a method for managing memory using a hybrid memory management layout. The memory management system may read a memory page cluster from the data storage device 150 (Block 702). The memory management system may read the memory page cluster as part of at least one of a hard fault cluster read, a page pre-fetch, a cache manager read ahead, and an antimalware scan. The memory management system may assign an initial priority level to the memory page cluster in a page priority list (Block 704). The memory management system may store the memory page cluster list 420 of a memory page cluster in a placeholder page entry 410 (Block 706). The memory management system may store a target priority level identifier 436 as a metadata tag 430 in the placeholder page entry 410 (Block 708). The memory management system store a protection period 438 as the metadata tag 430 in the placeholder page entry 410 (Block 710). The memory management system may store the placeholder page entry 410 in a page priority list 202 at an initial priority level 212 (Block 712). If a process executes a process access of a cluster member 422 (Block 714), the memory management system may remove that memory page from the memory page cluster (Block 716). The memory management system may move that memory page to a working group for the process (Block 718). Otherwise, if the protection period has expired (Block 720), the memory management system may release the placeholder page entry (Block 722). The memory management system may change the memory page cluster to the target priority level 214 in the page priority list 202 from the initial priority level 212 (Block 724).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A memory management system, comprising:
    a memory configured to store a page priority list assigning a memory page at an initial priority level in the page priority list describing repurposing priority for mapping the memory page to a virtual memory page; and
    a processor configured to change the memory page to a target priority level stored in a placeholder page entry in the page priority list after a protection period has expired.

2. The memory management system of claim 1, wherein the processor is further configured to read the memory page as part of at least one of a hard fault cluster read, a page pre-fetch, a cache manager read ahead, and an antimalware scan.

3. The memory management system of claim 1, wherein the memory is further configured to associate the target priority level with the memory page.

4. The memory management system of claim 1, wherein the memory is further configured to associate the protection period with the memory page.

5. The memory management system of claim 1, wherein the memory is further configured to store the protection period in the placeholder page entry.

6. The memory management system of claim 1, wherein the processor is further configured to move the memory page to a working group for a process upon a process access.

7. The memory management system of claim 1, wherein the processor is further configured to assign the memory page to a priority level of a working group upon a process access.

8. A computing device, having a memory configured to store a page priority list describing repurposing priority for mapping a memory page of physical memory to a virtual memory page, the computing device configured to assign to the memory page an initial priority level in the page priority list, and the computing device further configured to change the memory page to a target priority level in the page priority list after a protection period stored in a placeholder page entry in the page priority list has expired without a process access.

9. The computing device of claim 8, wherein the computing device is further configured to read the memory page as part of at least one of a hard fault cluster read, a page pre-fetch, a cache manager read ahead, and an antimalware scan.

10. The computing device of claim 8, wherein the computing device is further configured to store the target priority level in the placeholder page entry.

11. The computing device of claim 8, wherein the computing device is further configured to associate the target priority level with the memory page.

12. The computing device of claim 8, wherein the computing device is further configured to move the memory page to a working group for a process upon a process access.

13. The computing device of claim 8, wherein the computing device is further configured to assign the memory page to a priority level of a working group upon a process access.

14. A machine-implemented method, comprising:
    assigning to a memory page of physical memory an initial priority level in a page priority list describing repurposing priority for mapping the memory page to a virtual memory page; and
    changing the memory page to a target priority level stored in a placeholder page entry in the page priority list after a protection period has expired without a process access.

15. The method of claim 14, further comprising:
    associating the protection period with the memory page.

16. The method of claim 14, further comprising:
    storing the protection period in the placeholder page entry.

17. The method of claim 14, further comprising:
    moving the memory page to a working group for a process upon a process access.

18. The method of claim 14, further comprising:
    assigning the memory page to a priority level of a working group upon a process access.

19. The method of claim 14, further comprising:
    reading the memory page as part of at least one of a hard fault cluster read, a page pre-fetch, a cache manager read ahead, and an antimalware scan.

20. The method of claim 14, further comprising:
    associating the target priority level with the memory page.

* * * * *